June 6, 1950     D. R. MORRISON     2,510,188
LAWN RAKE
Filed Nov. 29, 1948
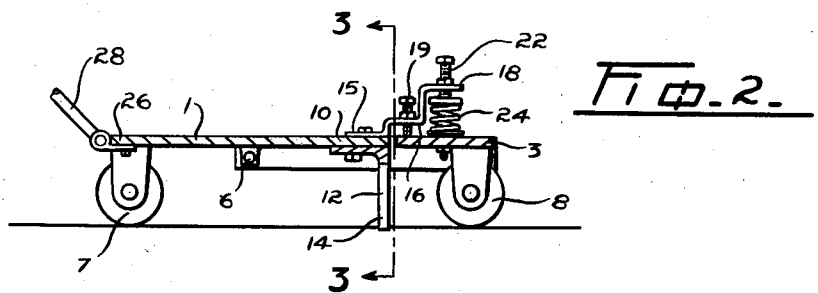
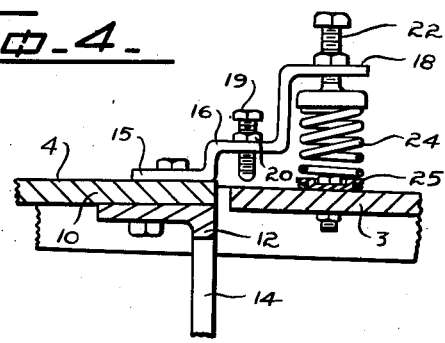
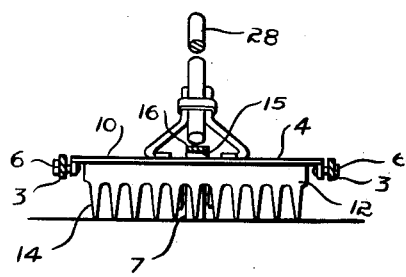
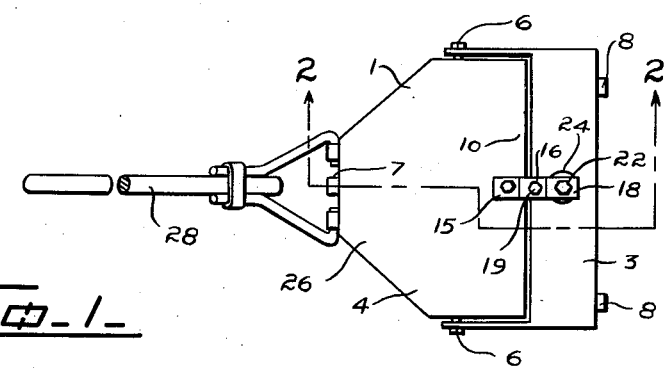
INVENTOR
DAVID R. MORRISON
Ernest E. Carver
ATTORNEY Patented June 6, 1950

2,510,188

UNITED STATES PATENT OFFICE 2,510,188

LAWN RAKE

David R. Morrison, Vancouver, British Columbia, Canada

Application November 29, 1948, Serial No. 62,479

2 Claims. (Cl. 56—400.14)

My invention relates to improvements in lawn rakes.

The objects of the invention are to provide a rake which will be effective in removing moss from lawns without requiring strenuous effort on the part of the operator; to provide means whereby the tines of the rake may be adjusted to depth and to prevent undue penetration of the lawn surface, such as to cause damage to grass roots, and to provide a structure by which moss disturbed by the rake will fall freely from the tines, thus preventing clogging of the rake.

The invention contemplates a hinged frame supported on wheels and a rake carried vertically below said frame adjacent the hinge, as will be more fully described in the following specification and shown in the accompanying drawings, in which—

Figure 1 is a plan view of the invention.

Figure 2 is a longitudinal view taken on the line 2—2 of Figure 1.

Figure 3 is a transverse sectional view taken on the line 3—3 of Figure 2.

Figure 4 is an enlarged detail sectional view of the preferred depth adjusting means.

In the drawings like characters of reference indicate corresponding parts in each figure.

The numeral 1 indicates generally a frame consisting of forward and rearward parts 3 and 4 respectively, which are hingedly connected together intermediate the length of the rearward part 4 as at 6. The rearward part 4 is preferably in the form of a flat plate and is supported upon one or more road wheels 7 and the forward part 3 is supported upon spaced front wheels 8, all of which are relatively broad of tread to prevent them from sinking deeply into the turf.

The leading edge 10 of the rearward part of the frame 1 supports a vertically disposed rake 12 having tines 14, which are pointed and which project downwardly into the turf bed when the frame parts 3 and 4 are level or in alignment with each other, and mounted on the leading edge is a cranked bracket 15 having two raised steps 16 and 18, both of which overhang the forward part of the frame member. The step 16 of the bracket 15 carries an adjustable stop bolt 19 fitted with a lock nut 20 by which the forward edge 10 is limited in its downward movement. The step 18 is provided with a bolt 22 to which a compression spring 24 is connected, this spring is adapted to bear upon the forward part 3 of the frame to permit said frame to flex slightly as the device is moved over irregular portions of the turf. The spring 24 may be secured at its lower end by a clip 25 to the forward part of the frame, but this is not essential. At the rear edge 26 of the frame part 4, an operating handle 28 is secured.

In use, the bolt 22 is adjusted so that the tines 14 will penetrate below the surface of the moss in the lawn and the bolt 19 is set to limit the penetration. The device is then moved in a back and forth motion over the lawn to rake out the moss from between the grass roots. By virtue of the substantially vertical position of the tines and the disposition of the handle whereby thrust thereon cannot increase or decrease the depth of the cut and by disposing the rake 12 relatively close to the front wheels 8 of the device, the tines are prevented from irregular surface penetration.

If the moss roots are highly developed and cause undue resistance to removal, the rearward part 4 of the frame may be loaded to smooth out the movement of the device.

It will also be realized that by placing the tines in a substantially vertical position there is no tendency for the moss to clog the rake, but allows said moss to drop back onto the lawn for collection later.

What I claim as my invention is:

1. A moss rake comprising a carriage having front and rear wheels, said carriage being divided into front and rear portions, the rear end of the front portion being hingedly connected to the rear portion intermediate its length, a transversely extending rake depending from the front end of the rear portion between the hinge points of the front and rear portions and directly behind the front wheels, and a handle for moving the carriage.

2. A moss rake comprising a carriage having front and rear wheels, said carriage being divided into front and rear portions, the rear end of the front portion being hingedly connected to the rear portion intermediate its length, a transversely extending rake depending from the front end of the rear portion between the hinge points of the front and rear portions and directly behind the front wheels, and a handle for moving the carriage, and spring means for supporting the rake at a predetermined elevation in respect to the front wheels.

DAVID R. MORRISON.

REFERENCES CITED

The following references are of record in the file of this patent:

UNITED STATES PATENTS

| Number | Name | Date |
|--------|------|------|
| 281,003 | Benton | July 10, 1883 |

FOREIGN PATENTS

| Number | Country | Date |
|--------|---------|------|
| 206,126 | Switzerland | 1939 |